(12) United States Patent
Anderson et al.

(10) Patent No.: US 7,945,524 B2
(45) Date of Patent: May 17, 2011

(54) SYSTEM AND METHOD FOR GRADING ELECTRICITY DISTRIBUTION NETWORK FEEDERS SUSCEPTIBLE TO IMPENDING FAILURE

(75) Inventors: Roger N. Anderson, New York, NY (US); Albert Boulanger, New York, NY (US); David L. Waltz, Princeton, NJ (US); Phil Long, Palo Alto, CA (US); Marta Arias, Barcelona (ES); Philip Gross, New York, NY (US); Hila Becker, Plainview, NY (US); Arthur Kressner, New York, NY (US); Mark Mastrocinque, East Northport, NY (US); Matthew Koenig, Valley Stream, NY (US); John A. Johnson, Belle Harbor, NY (US)

(73) Assignees: The Trustess of Columbia University in the City of New York, NY, NY (US); Consolidated Edison of New York, Inc., NY, NY (US)

( * ) Notice: Subject to any disclaimer, the term of this patent is extended or adjusted under 35 U.S.C. 154(b) by 171 days.

(21) Appl. No.: 12/178,553

(22) Filed: Jul. 23, 2008

(65) Prior Publication Data
US 2009/0157573 A1 Jun. 18, 2009

Related U.S. Application Data

(63) Continuation of application No. PCT/US2007/060926, filed on Jan. 23, 2007.

(60) Provisional application No. 60/831,090, filed on Jul. 14, 2006, provisional application No. 60/761,137, filed on Jan. 23, 2006.

(51) Int. Cl.
*G06F 15/18* (2006.01)

(52) U.S. Cl. .................................................. 706/12
(58) Field of Classification Search ................. None
See application file for complete search history.

(56) References Cited

U.S. PATENT DOCUMENTS

| | | | |
|---|---|---|---|
| 5,893,069 A | 4/1999 | White, Jr. | |
| 5,963,457 A | 10/1999 | Kano et al. | |
| 6,125,453 A * | 9/2000 | Wyss | 714/1 |
| 6,629,044 B1 | 9/2003 | Papallo, Jr. et al. | |
| 2003/0016004 A1 | 1/2003 | Jungwirth et al. | |
| 2004/0034608 A1 | 2/2004 | De Miranda et al. | |

(Continued)

OTHER PUBLICATIONS

'The meaning and use of the area under a receiver operating characteristic (ROC) curve': Hanley, 1982, Radiology, Apr. 1982, pp. 29-36.*

(Continued)

Primary Examiner — Michael B. Holmes
Assistant Examiner — Peter Coughlan
(74) Attorney, Agent, or Firm — Baker Botts, L.L.P.

(57) ABSTRACT

A machine learning system creates failure-susceptibility rankings for feeder cables in a utility's electrical distribution system. The machine learning system employs martingale boosting algorithms and Support Vector Machine (SVM) algorithms to generate a feeder failure prediction model, which is trained on static and dynamic feeder attribute data. Feeders are dynamically ranked by failure susceptibility and the rankings displayed to utility operators and engineers so that they can proactively service the distribution system to prevent local power outages. The feeder rankings may be used to redirect power flows and to prioritize repairs. A feedback loop is established to evaluate the responses of the electrical distribution system to field actions taken to optimize preventive maintenance programs.

32 Claims, 17 Drawing Sheets

U.S. PATENT DOCUMENTS

2005/0034023 A1* 2/2005 Maturana et al. .............. 714/37
2005/0071266 A1* 3/2005 Eder .............................. 705/38
2005/0262031 A1 11/2005 Saidi et al.

OTHER PUBLICATIONS

'Reliablity centred maintence strategy for high voltage networks': Zdallek, Sep. 2004, 8$^{th}$ international conference on probabilistic methods applied to power systems. pp. 332-337.*

'Predicting electricity distribution feeder failures using machine learning susceptibility analysis': Gross, 2006, AAAI, Proceedings of the 18$^{th}$ conference on innovative applications of artificial intelligence, pp. 1705-1711.*

Shortened version of chapter 6 of the book 'Artificial intelligence techniques in power systems': Warwick, IEE Power engineering Series 22, 1997.*

'Experimental studies with continually online trained artificial neural networks identifiers for multiple turbogenerators on the electric power grid': Venayagamoorthy, 2001, IEEE, 0/7803-7044, pp. 1267-1272.*

'Demand side management using expert systems': 2003, TENCON 2003. Conference on Convergent Technologies for Asia-Pacific Region, Rajan, IEEE, 0-7803-7651.*

Kong, K.Y.: "Web-based monitoring of real-time ECG data." *Computers in Cardiology* (2000). vol. 27 pp. 189-192.

\* cited by examiner inputs: list $L$ of attribute-value descriptions of feeders with associated nr. of failures; nr of boosting rounds $T$
output: marti-model $M$ 1. let $M$ be the empty model
2. for each round $t=1..,T$ do:

- partition $L$ in $t$ sub-lists $L_1,..., L_t$ s.t. each $L_j$ has same nr. of failures; let $th_2,..., th_t$ be the location of the splits in terms of the normalized fraction of feeders that fall above the split.

- for each sub-list $i=1,...,t$ do:

i. compute quality for $L_i$ sort
     ii. for each attribute A do:
        1. sort $L_i$ according to A in ascending order, compute quality of resulting sort
        2. sort $L_i$ according to A in *descending* order, compute quality of resulting sort

- if there exists attribute A and polarity P the improves $L_i$'s sort, then:
     i. if $i>1$, add $th_i$ to M at level t, position i
     ii. add A to M at level t, position i.
     iii. sort $L_i$ according to (A,P)
   - else:
     i. if $i>1$, add $th_i$ to M at level t, position i
     ii. add "NOP" to M at level t, position i.
3. output M

FIG.3A

- Each time a failure occurs, we add:
  1. Real time data of feeder that failed (at time of failure) with label "1"
  2. Real time data of "similar" feeder that failed (at time of failure) with label "0"
  3. Real time data of feeder in same network (at time of failure) with label "0"
  4. Real time data of feeder in same borough (at time of failure) with label "0"
  5. Real time data of feeder that failed but at previous time (when it had not failed) with label "0"

FIG.5

Training a model

- Run marti as usual:

- # failures = 10, rank of failure = 3
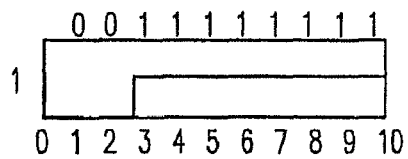
AUC = 8/10 = 0.8
PERF = 1 − 3/10 = 0.7
- # failures = 10, rank of failure = 3, 7
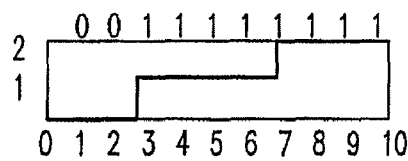
AUC = 12/20 = 0.6
Avg. rank = 3 + 7/2 = 5
PERF= 1 − 5/10 = 0.5
- # failures = 10, rank of failure = 3, 4, 7
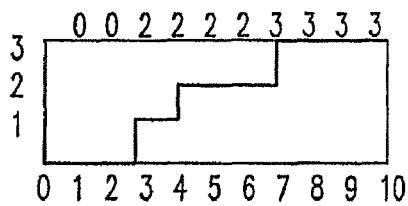
AUC = 19/30 = 0.633
Avg. rank = 3 + 4 + 7/3 = 4.67
PERF = 1 − 4.67/10 = 0.533
FIG.9

Feeder: 03M46 (susceptibility ranking 42)
Last action 'Live endcap' confirmed on vault ' V0280' dated '2005.12.18 14:27:44.35'
At-Risk Transformers/Open-nearbys in Yorkville on feeder 03M46

| Vault nhys (factor) | Feeder | Status | Action (Initiated) | Action (Confirmed) | R T 3 (°C) Top(N) | R T 3 (°C) Height | %Load/Voltage A_TH | %Load/Voltage E_TH | %Load/Voltage C_TH | Flags | Size | Last Scan |
|---|---|---|---|---|---|---|---|---|---|---|---|---|
| V1413 | 03M46 | closed | | | 42 | 43 | 31/NA | 29/NA | 29/NA | | 0500 | 14:25 |
| V0280 (32) | 03M62 | bank off | Banks off | Live Endcap | (0) | (0) | 35/NA | 35/NA | 35/NA | B | 0500 | 99/01/07.16:03 |
| V1629 (1) | 03M46 | open | Close | | (F) | (F) | 0/126 | 0/126 | 2/127 | B | 0500 | 14:15 |
| V4220 | 03M46 | closed | | | 45 | 46 | 34/NA | 34/NA | 39/NA | | 1000 | 14:18 |
| V1714 (31) | 03M58 | fuse | Replace fuse | | 28 | 29 | 26/NA | 33/NA | 0/NA | A | 1000 | 14:25 |
| V5949 | 03M46 | old | Check Closed | | 54 | 54 | 33/NA | 33/NA | 38/124 | | 1000 | 04:40 |
| V4062 (15) | 03M58 | fuse | Replace fuse | | 32 | 32 | 45/NA | 47/NA | 47/NA | | 1000 | 14:22 |
| TM2043 (9) | 03M58 | open | Close | | (0) | (0) | 0/NA | 0/NA | 0/NA | B | 0500 | 06/12.05.59 |
| V6711 | 03M46 | closed | | | 50 | 53 | 49/NA | 49/NA | 51/NA | | 1000 | 14:07 |
| TMU579 (8) | 03M42 | fuse | Replace fuse | | (0) | (0) | 111/NA | 154/NA | 0/NA | ACDE | 0500 | 03/09/14-20:51 |
| Y1074 | 03M46 | closed | | | 42 | 42 | 20/123 | 20/123 | 20/124 | | 0500 | 14:25 |
| V735U (2) | 03M63 | open | Close | | 10 | 10 | 0/NA | 0/NA | 0/NA | | 1000 | 14:25 |
| V9236 | 03M46 | closed | | | 44 | 46 | 31/NA | 34/NA | 34/NA | B | 1000 | 14:05 |
| TM0579 (1) | 03M42 | fuse | Replace fuse | | (0) | (0) | 111/NA | 154/NA | 0/NA | ACDE | 0500 | 03/09/14-20:51 |

Action tracking

Live end cap confirmed

Close open network protector on V1629

At-risk transformers/Old-nearbys on feeder 03M46

| Vault nhys (factor) | Feeder | Status | Action (Initiated) | Action (Confirmed) | R T 3 (°C) Top(N) | R T 3 (°C) Height | %Load/Voltage A_TH | %Load/Voltage E_TH | %Load/Voltage C_TH | Flags | Size | Last Scan |
|---|---|---|---|---|---|---|---|---|---|---|---|---|

Every night at 4am:

Get performance of each active model
   Update scores of active models based on performance on latest data
   Generate new population of models
   If too many, drop old bad=scoring models

FIG.16

SYSTEM AND METHOD FOR GRADING ELECTRICITY DISTRIBUTION NETWORK FEEDERS SUSCEPTIBLE TO IMPENDING FAILURE

CROSS-REFERENCE TO RELATED APPLICATIONS

This is a continuation of International Application PCT/US2007/060926, filed Jan. 23, 2007, which claims priority to U.S. Provisional Application Ser. No. 60/831,090, filed Jul. 14, 2006 and U.S. Provisional Application Ser. No. 60/761,137, filed Jan. 23, 2006, the disclosures of which are incorporated herein by reference in their entireties.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

FIELD OF THE INVENTION

The invention relates to machine learning systems and techniques for operating complex multi-component business or technological enterprises whose behaviors are described by stochastic interactions between the enterprise components and subcomponents. In particular, the invention relates to the application of machine learning techniques for guidance in allocation of resources for maintenance, reinforcement, and tactics or strategies to optimize and/or enhance the performance of electrical power distribution systems and other networked systems such as telecommunication systems, transportation, water, sewer and gas distribution networks

BACKGROUND OF THE INVENTION

Power utilities generate electrical power at remote plants and deliver electricity to residential, business or industrial customers via transmission networks and distribution grids. Power is first transmitted as high voltage transmissions from the remote power plants to geographically diverse substations. From the substations, the received power is sent using cables or "feeders" to local transformers that further reduce the voltage. The outputs of the transformers are connected to a local low voltage power distribution grid that can be tapped directly by the customers. The power distribution grids may be configured as either radial or networked systems. A radial distribution system includes a number of feeder circuits that extend radially from a substation. Each circuit serves customers within a particular area and the failure of a radial circuit cuts off electric service to the customers on that circuit. In a networked distribution system, service is provided through multiple transformers connected in parallel, as opposed to the radial system in which there is only one path for power to flow from the substation to a particular load. A networked distribution system provides multiple potential paths through which electricity can flow to a particular load. By its nature, a networked distribution system is more reliable than a radial distribution system. When a networked distribution system is properly designed and maintained, the loss of any single low or high voltage component usually does not cause an interruption in service or degradation of power quality. Network protection devices or switches automatically operate to isolate the failed component. Networked distribution systems are installed in high-load density metropolitan areas (e.g., Chicago and New York City) that require reliable electricity service.

FIG. 1 shows the conventional infrastructure 100 associated with delivering electrical power to residential, business, or industrial customers. Infrastructure 100 may be viewed as having four primary sections, namely, generation 110, transmission 120, primary distribution 130, and secondary distribution 140. Generation 110 involves a prime mover, which spins an electromagnet, generating large amounts of electrical current at a power plant or generating station. Transmission 120 involves sending the electrical current at very high voltage (e.g., at hundreds of kV) from the generating station to substations closer to the customer. Primary distribution 130 involves sending electricity at mid-level voltage (e.g., at tens of kV) from substations to local transformers over cables (feeders). Each of the feeders, which may be 10-20 km long (e.g., as in the case of Consolidated Edison Company of New York, Inc.'s (Con Ed's) distribution system in New York City), supplies electricity to a few tens of local transformers. Each feeder may include many feeder sections connected by joints and splices. Secondary distribution 140 involves sending electricity at nominal household voltages from local transformers to individual customers over radial or networked feeder connections.

In metropolitan areas (e.g., New York City), the feeders run under city streets, and are spliced together in manholes. Multiple or redundant feeders may feed through transformers the customer-tapped secondary grid, so that individual feeders may fail without causing power outages. For example, the electrical distribution grid of New York City is organized into networks, each composed of a substation, its attached primary feeders, and a secondary grid. The networks are electrically isolated from each other to limit the cascading of problems or disturbances. Network protection switches on the secondary side of network transformers may be used for isolation. The primary feeders are critical and have a significant failure rate (i.e., a mean time between failures of less than 400 days). Therefore, much of the daily work of the power company's field workforce involves the monitoring and maintenance of primary feeders, as well as their speedy repair on failure.

Multiple or redundant feeders may feed the customer-tapped grid, so that individual feeders may fail without, causing power outages. The underground distribution network effectively forms at least a 3-edge connected graph—in other words, any two components can fail without disrupting delivery of electricity to customers. Most feeder failures result in automatic isolation—so called "Open Autos" or O/As. When an O/A occurs, the load that had been carried by the failed feeder must shift to adjacent feeders, further stressing them. O/As put networks, control centers, and field crews under considerable stress, especially during the summer, and cost millions of dollars in operations and maintenance expenses annually.

Providing reliable electric supply requires active or continuous "control room" management of the distribution system by utility operators. Real-time response to a disturbance or problem may, for example, require redirecting power flows for load balancing or sectionalizing as needed. The control room operators must constantly monitor the distribution system for potential problems that could lead to disturbances. Sensors may be used to monitor the electrical characteristics (e.g., voltage, current, frequency, harmonics, etc.) and the condition of critical components (e.g., transformers, feeders, secondary mains, and circuit breakers, etc.) in the distribution system. The sensor data may guide empirical tactics (e.g., load redistribution in summer heat waves) or strategies (e.g., scheduling network upgrades at times of low power demand in the winter); and provide indications of unique or peculiar component life expectancy based on observations of unique or peculiar loads. Power companies and utilities have developed models for evaluating the danger that a particular feeder or other network component could fail. The models, which are based on traditional statistical techniques such as linear regression analysis, provide likelihood of network failure or jeopardy scores, which may be used to prioritize component testing (e.g., high voltage isolation testing ("Hipot testing")), network repairs, maintenance or reinforcement. However, in practice, the scores obtained using the current models are a weak guide and provide only a rough indication of likely failure events.

Consideration is now being given to improving prior art systems and methods for management of an electrical power distribution system. Attention is being directed to applying machine learning to the development of short-term and long-term strategies for operating the electrical power distribution system to provide reliable electric service.

SUMMARY OF THE INVENTION

Machine learning systems and methods are provided for assessing or scoring the likelihood-of-failure of individual components of a multi-component business or technological enterprise. The machine learning (hereinafter "ML") systems and methods may be applied to electrical distribution systems to assign likelihood-of-failure scores to individual components, and to further rank the individual components in ascending or descending order according to the assigned scores. These likelihood-of-failure scores are relative, and are referred to herein as "susceptibility." In the embodiment of the invention described herein, the exemplary susceptibility scores are not absolute statistical scores that can be obtained, for example, from survival analysis. However, it will be understood that the invention is not limited to the exemplary susceptibility scores, but includes the use of absolute scores obtained from survival or other suitable analysis. The ML systems and methods may be used to rank or order a list of electrical distribution system components by likelihood of impending failure so that effective short-term and/or long-term preventive maintenance strategies for reliable and economical operation of the distribution system can be developed. The ranking of components allows timely actions to be taken or prioritized with respect to those components that are most susceptible to failure.

A particular embodiment of such an ML system—Ranker for Open-Auto Maintenance Scheduling (ROAMS), is provided for creating failure-susceptibility rankings of components (e.g., feeder cables, joints, transformers, switches, and other hardware or software components) in an electrical utility's primary distribution network. ROAMS may include a suitable interactive human interface (e.g., Integrated Decision Support for Feeder Susceptibility ("IDSFS")). Advantageously, the ROAMS system ranks the feeders most susceptible to impending failure with sufficient accuracy so that timely preventive maintenance can be performed on at-risk components to prevent incidents of feeder failure.

The computational machine learning algorithms used in ROAMS or other ML systems consistent with present invention, may be based on, for example, artificial neural networks, nonlinear regression, support vector machines (SVM), boosting, and/or reinforcement learning techniques. Each of these techniques has its own characteristic "inductive bias" when evaluating data. The techniques used in ROAMS may be selected application-by-application with consideration of the techniques' inductive biases and the quality of the aggregate predictors desired or obtained in specific application circumstances.

A version of the ROAMS system includes a machine learning engine, which uses martingale boosting algorithms to train feeder failure susceptibility models. Suitable martingale boosting algorithms are described, for example, in commonly assigned and co-pending U.S. patent application Ser. No. 11/349,711 incorporated by reference herein. The martingale boosting algorithms are suitable for directly generating feeder ranking models. Feeder attribute data sets, which include data on static feeder attributes and dynamic feeder attributes, may be used as training data for the models. A trained feeder ranking model is used to rank feeders in the electrical utility's primary distribution network. Another version of the ROAMS system includes a machine learning engine which uses SVM algorithms or a combination of SVM and boosting algorithms to train feeder failure susceptibility models.

The ROAMS system may be configured to train models to update feeder failure-susceptibility rankings dynamically as new data on the electrical distribution system conditions or behavior becomes available. Alternatively, or additionally, the ROAMS system may be configured to train models to support strategic decisions or policy, for example, by making seasonal predictions of feeder failure susceptibility. The ROAMS system may also include a decision support application, which makes current feeder rankings available to users. The decision support application, which may be web-based, can be integrated with other utility system applications to provide an integrated view of feeder status, utility operations and history.

BRIEF DESCRIPTION OF THE DRAWINGS AND APPENDIX

Further features of the invention, its nature, and various advantages will be more apparent from the following detailed description of the preferred embodiments and the accompanying drawing in which:

FIG. 1 is a schematic diagram illustrating the infrastructure associated with the generation, transmission and distribution of electricity to customers. The electrical distribution system may involve, for example, (1) power generation at 75 kilovolts (kV), (2) high voltage transmission at 325 kV to a sub-station at which the voltages are stepped down to 3, 13, 27, or 33 kV, and (3) transmission of the stepped-down voltages over distribution feeders to local transformers, which (4) further convert the power to standard line voltages (i.e., 110, 220, or 440 volts) for delivery to consumers.

FIGS. 3a and 3b are illustrations of an exemplary learning algorithm (i.e. "MartiRank Algorithm"), which generates a predictive feeder failure model, in accordance with the principles of the present invention.

Figure 4:
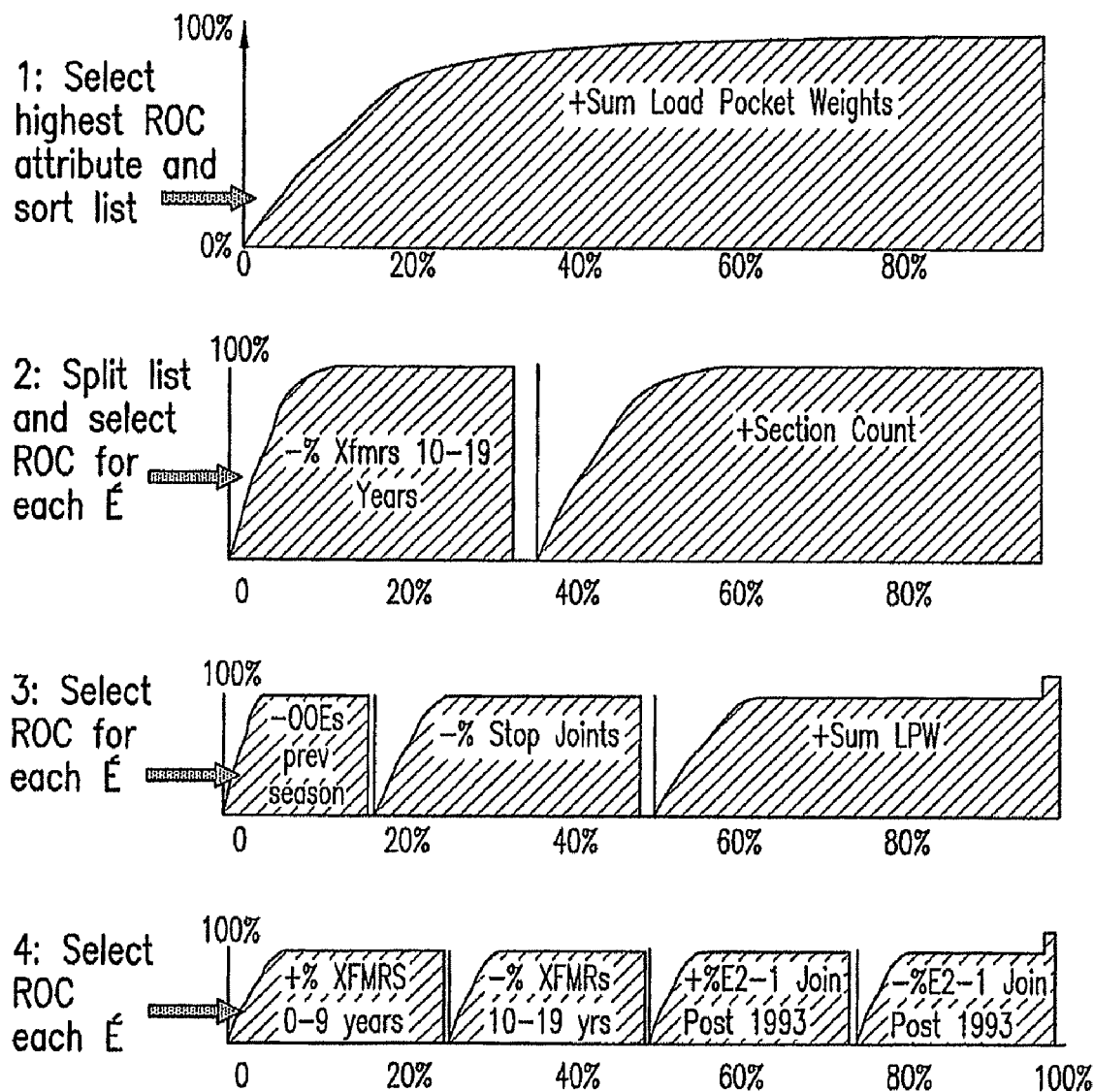

FIG. 4 is an illustration of an exemplary feeder failure model generated using training data sets that are supplemented using similarity-based matching schema of FIG. 5 (below), in accordance with the principles of the present invention. The similarity matching may be based on propensity scores, Euclidean, Manhattan, Mahalanobis, Chebychev, Spearman, Pearson Correlation coefficient distance metrics, or other suitable criteria.

FIG. 5 is a schema under which the machine learning algorithm uses a series of comparisons of a failed feeder to "placebo" feeders of similar health to the failed feeder to recognize or identify the particular attribute sequences that lead to feeder failure, in accordance with the principles of the present invention.

Figure 6:
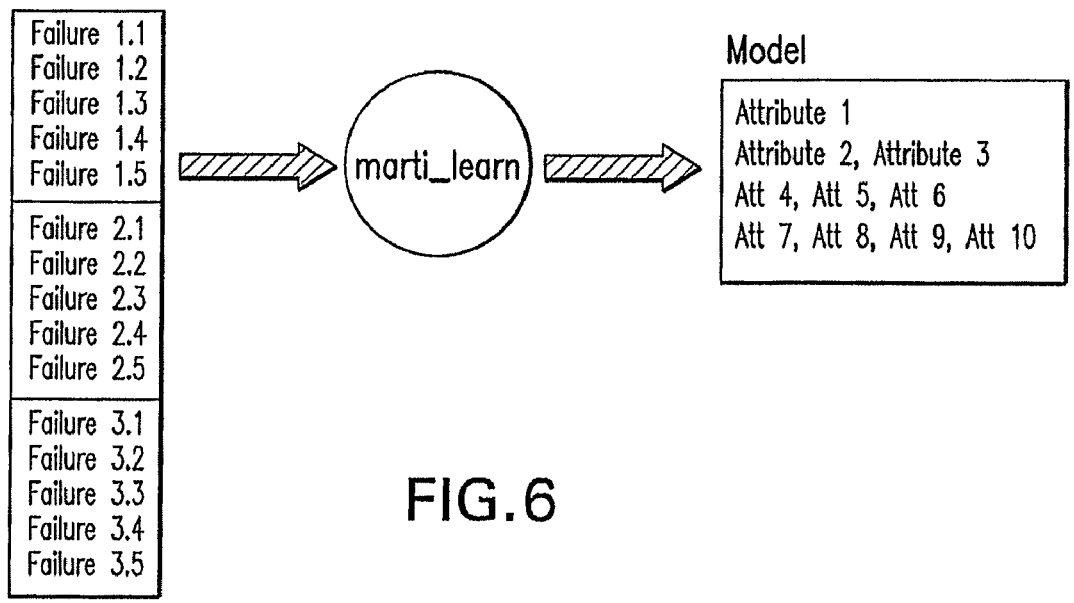

FIG. 6 is a block diagram illustrating model training with the MartiRank Algorithm.

Figure 7:
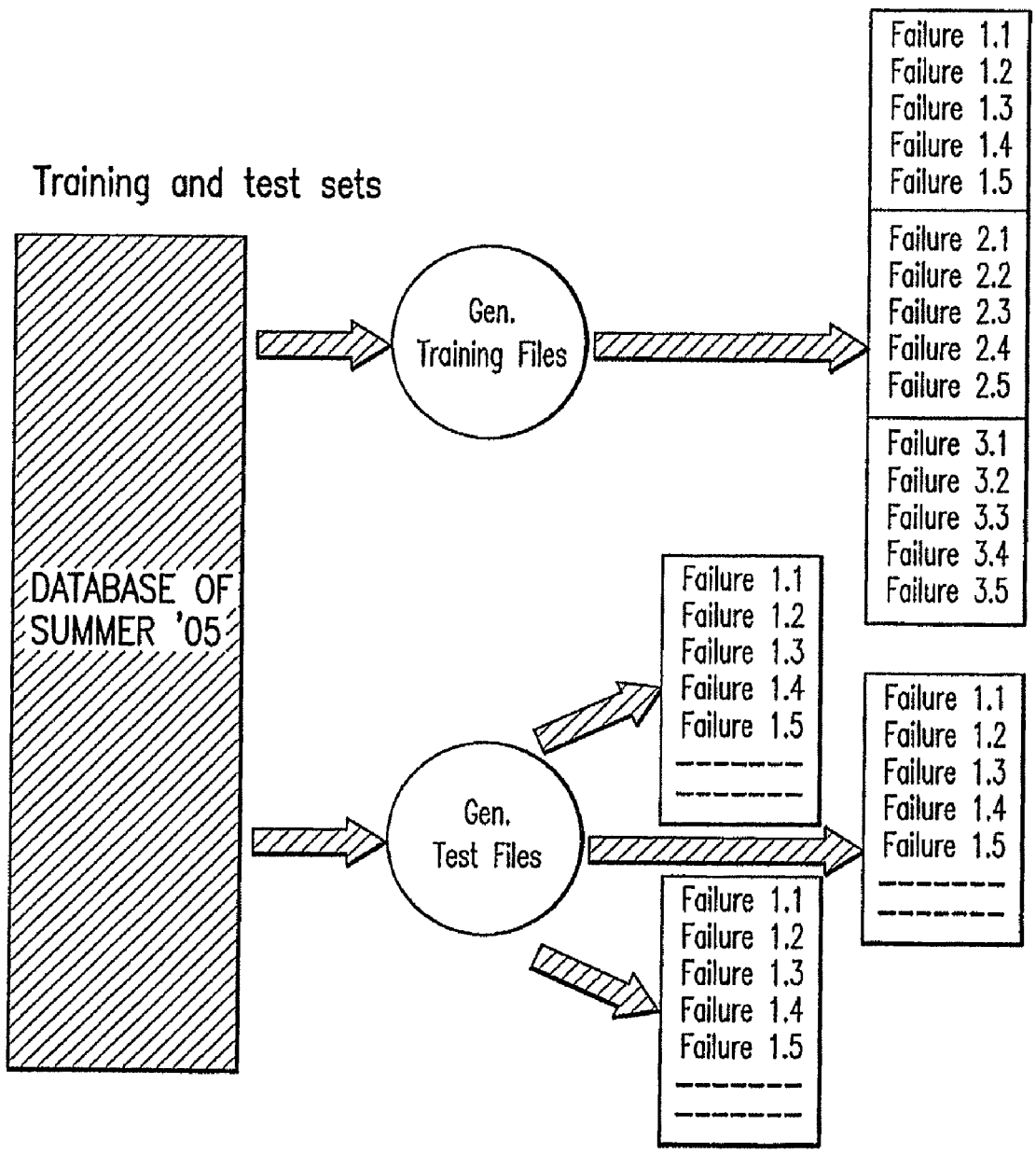

FIG. 7 is a block diagram illustrating a set of test files that are withheld to verify or evaluate the model trained on the training files.

Figure 8:
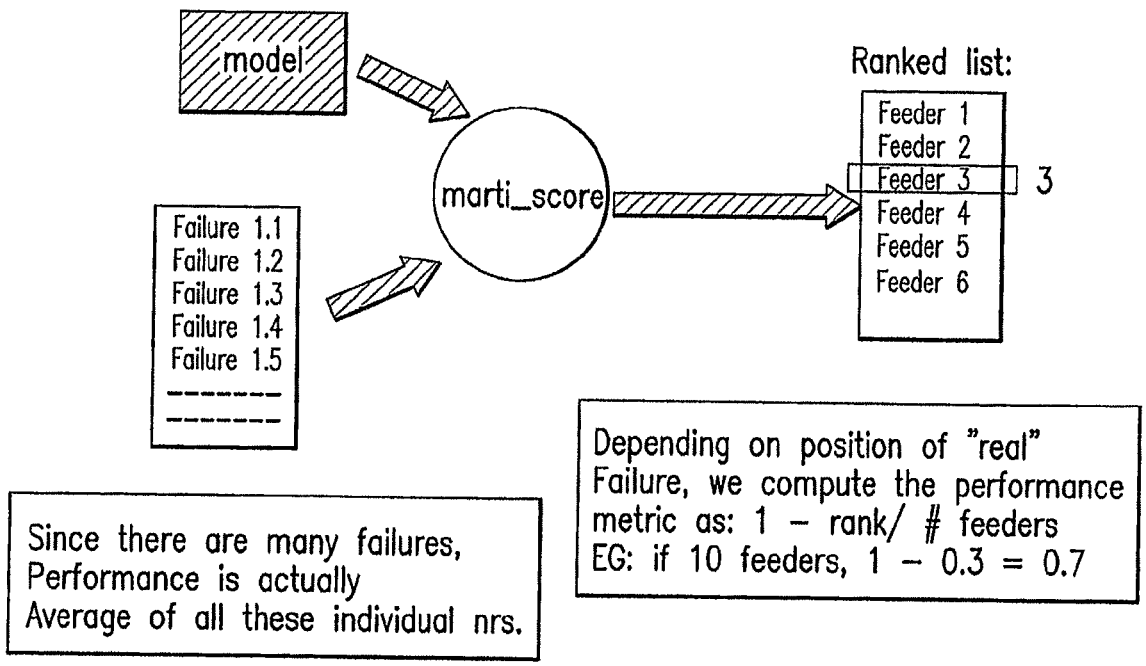

FIG. 8 is a block diagram illustrating an exemplary method for quantitative performance assessment of the trained models.

FIG. 9 illustrates a failure-by-failure construction of ROC curves for model performance evaluation.

Figure 10:
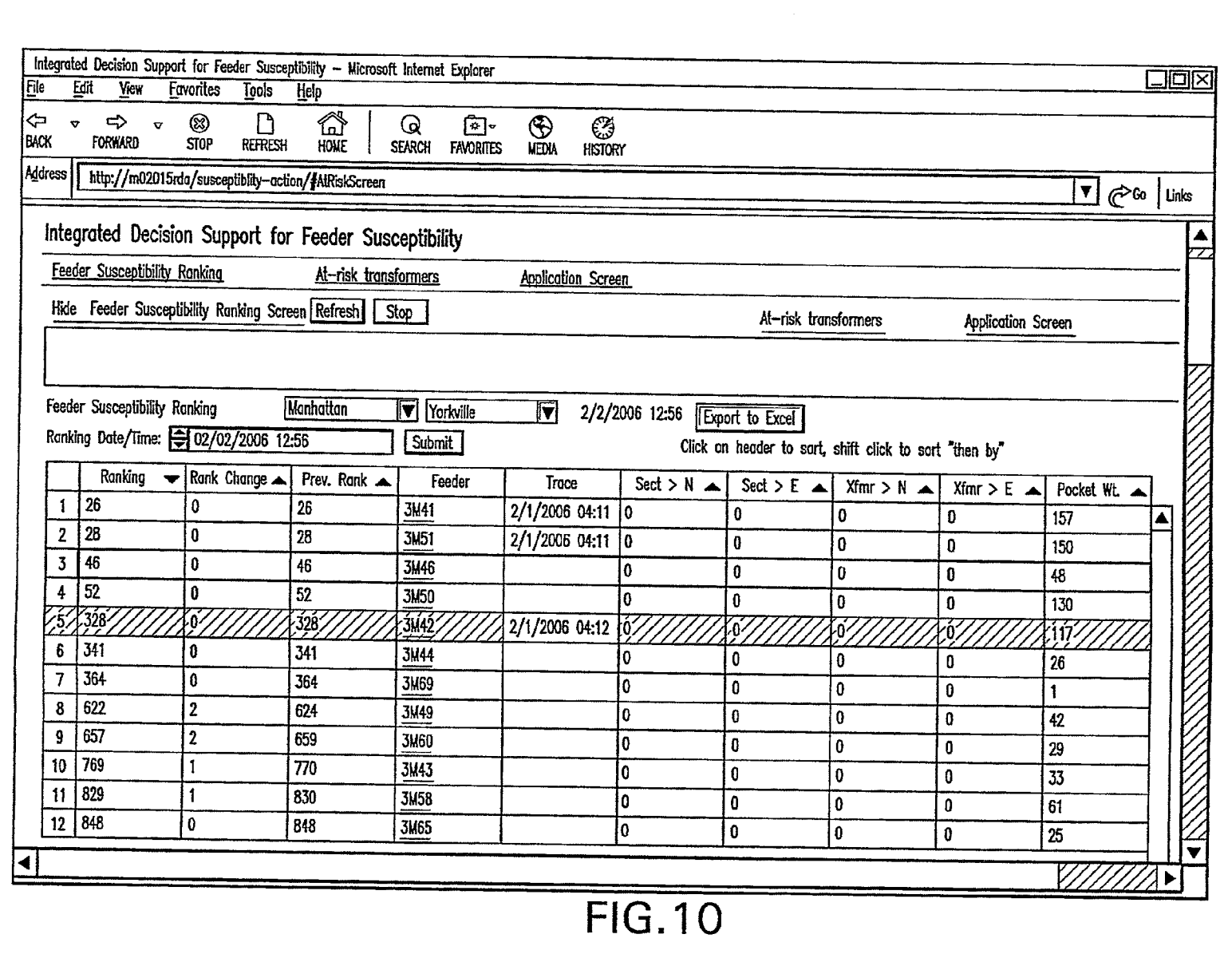

FIG. 10 is a screen shot of a web-based display, which makes current feeder failure-susceptibility rankings available in real time to control center operators, in accordance with the principles of the present invention. (Copyright© 2006, The Trustees of Columbia University in the City of New York, and Consolidated Edison, Inc.).

FIG. 11 is a screen shot of an action tracking application integrated with the feeder ranking display of FIG. 10, in accordance with the principles of the present invention. (Copyright© 2006, The Trustees of Columbia University in the City of New York, and Consolidated Edison, Inc.).

Figure 12:
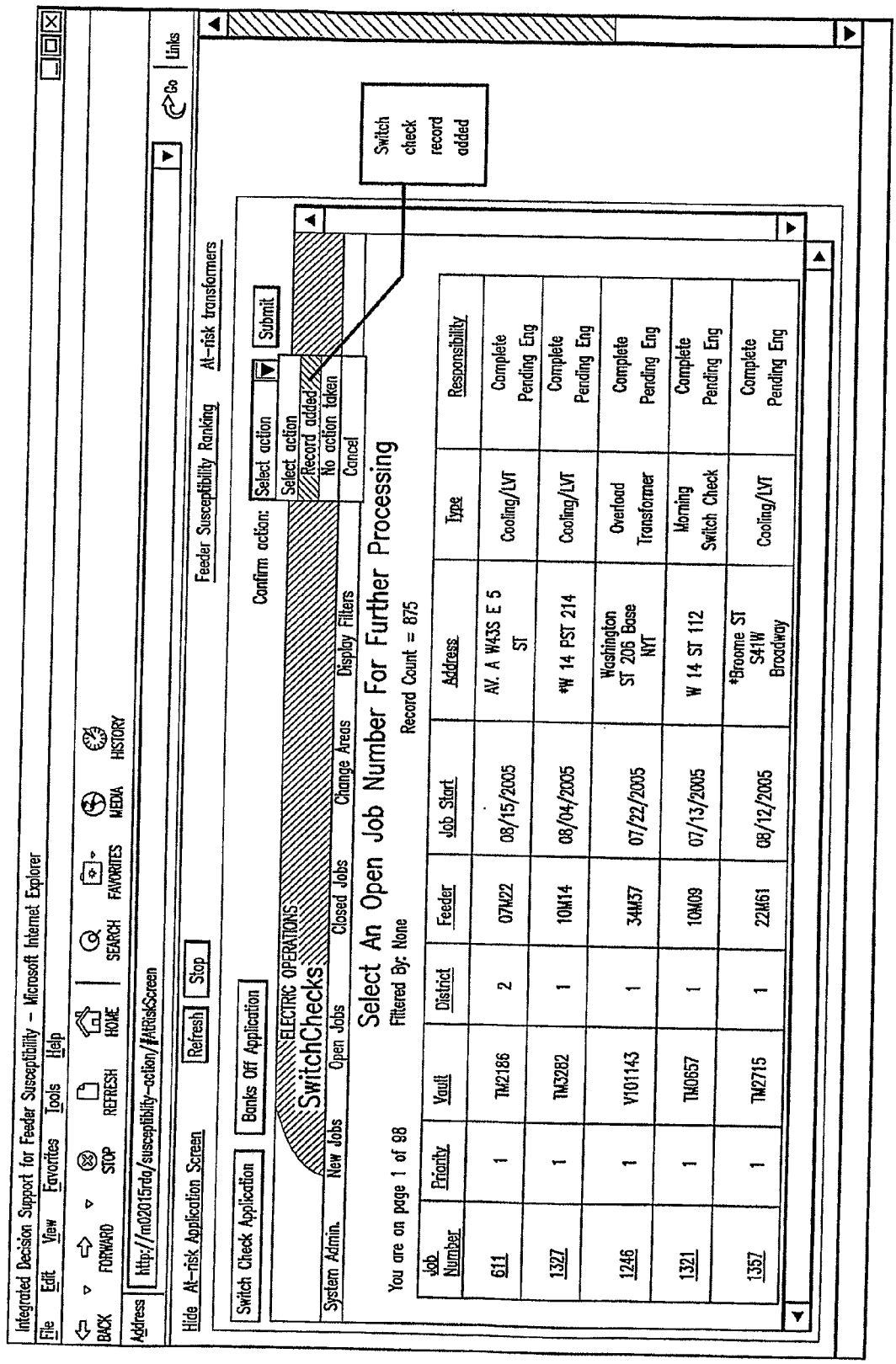

FIG. 12 is a screen shot of an application for initiating short-term actions, which is integrated with the feeder ranking display of FIG. 10, in accordance with the principles of the present invention. (Copyright© 2006, The Trustees of Columbia University in the City of New York, and Consolidated Edison, Inc.).

Figure 13:
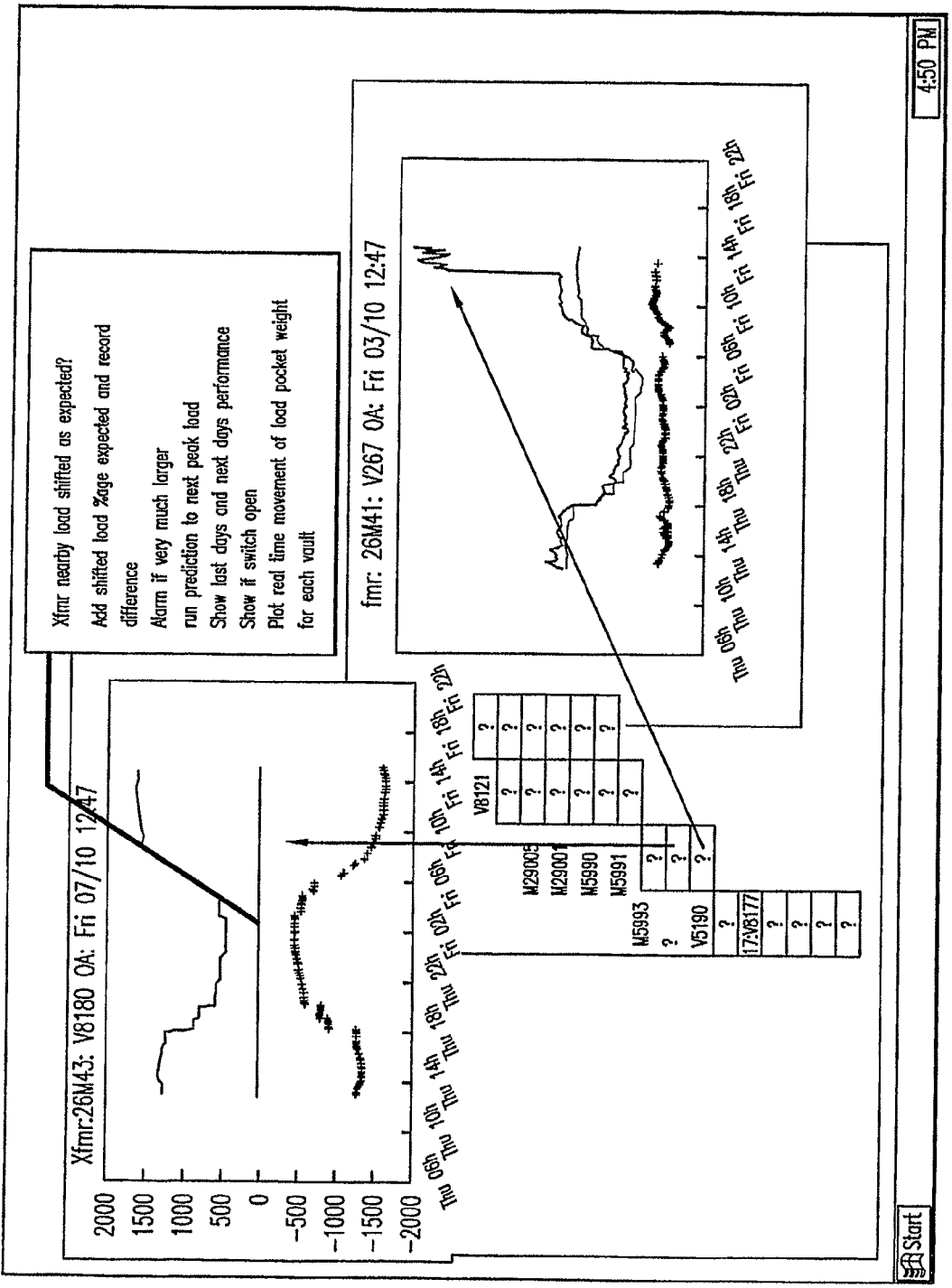

FIG. 13 is a Real-time Variance detection display that compares the expected and observed performance of load transfer in the electrical distribution network when any feeder is taken out of service for maintenance or dropped due to network failure (OAs). (Copyright© 2006, The Trustees of Columbia University in the City of New York, and Consolidated Edison, Inc.).

Figure 14:
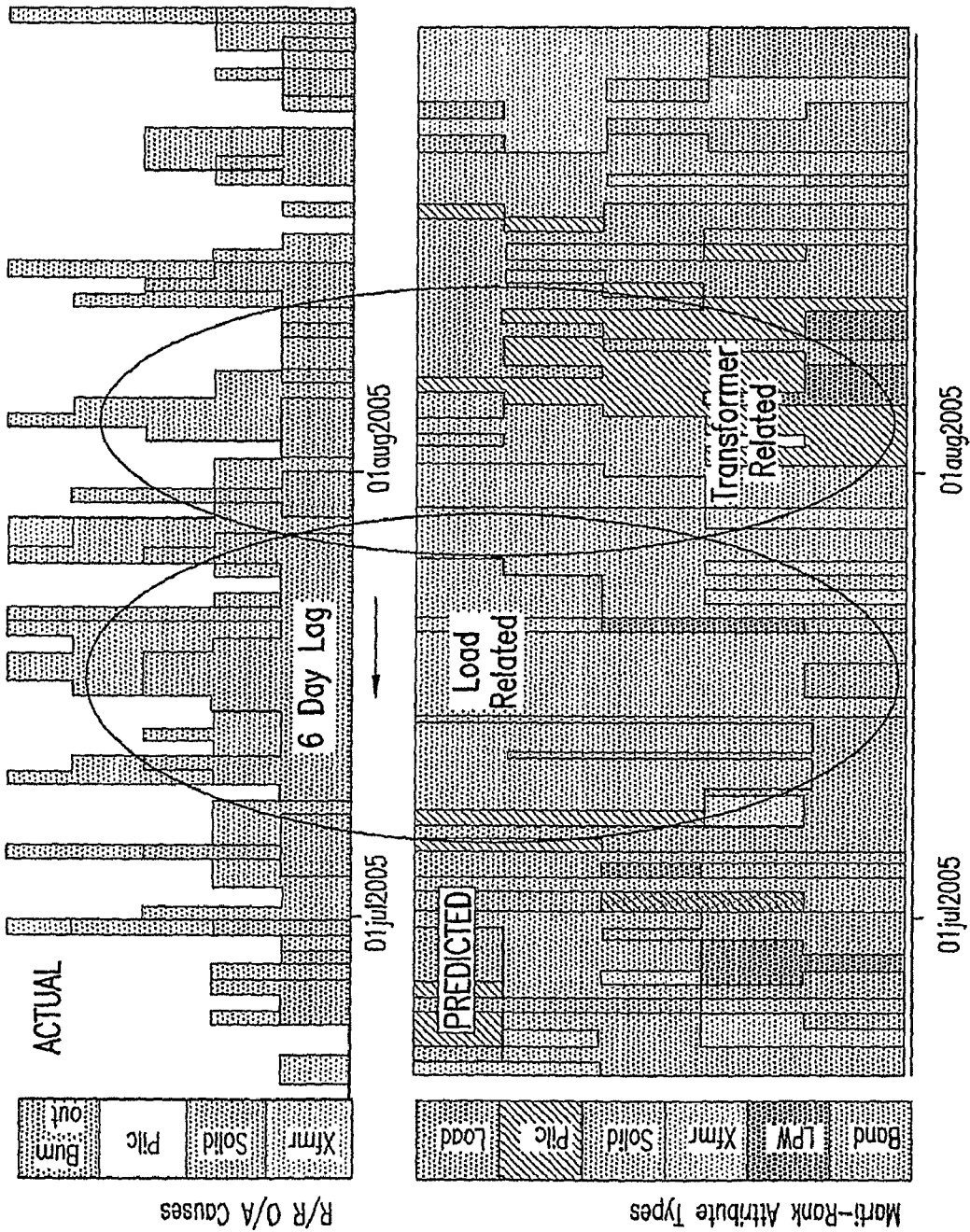

FIG. 14 is a graphical illustration of the comparison between the actual feeder outages and the predicted component failures, which closes the machine learning feedback loop and validates the predictions from the ROAMS system. (Copyright© 2006, The Trustees of Columbia University in the City of New York, and Consolidated Edison, Inc.).

Figure 15:
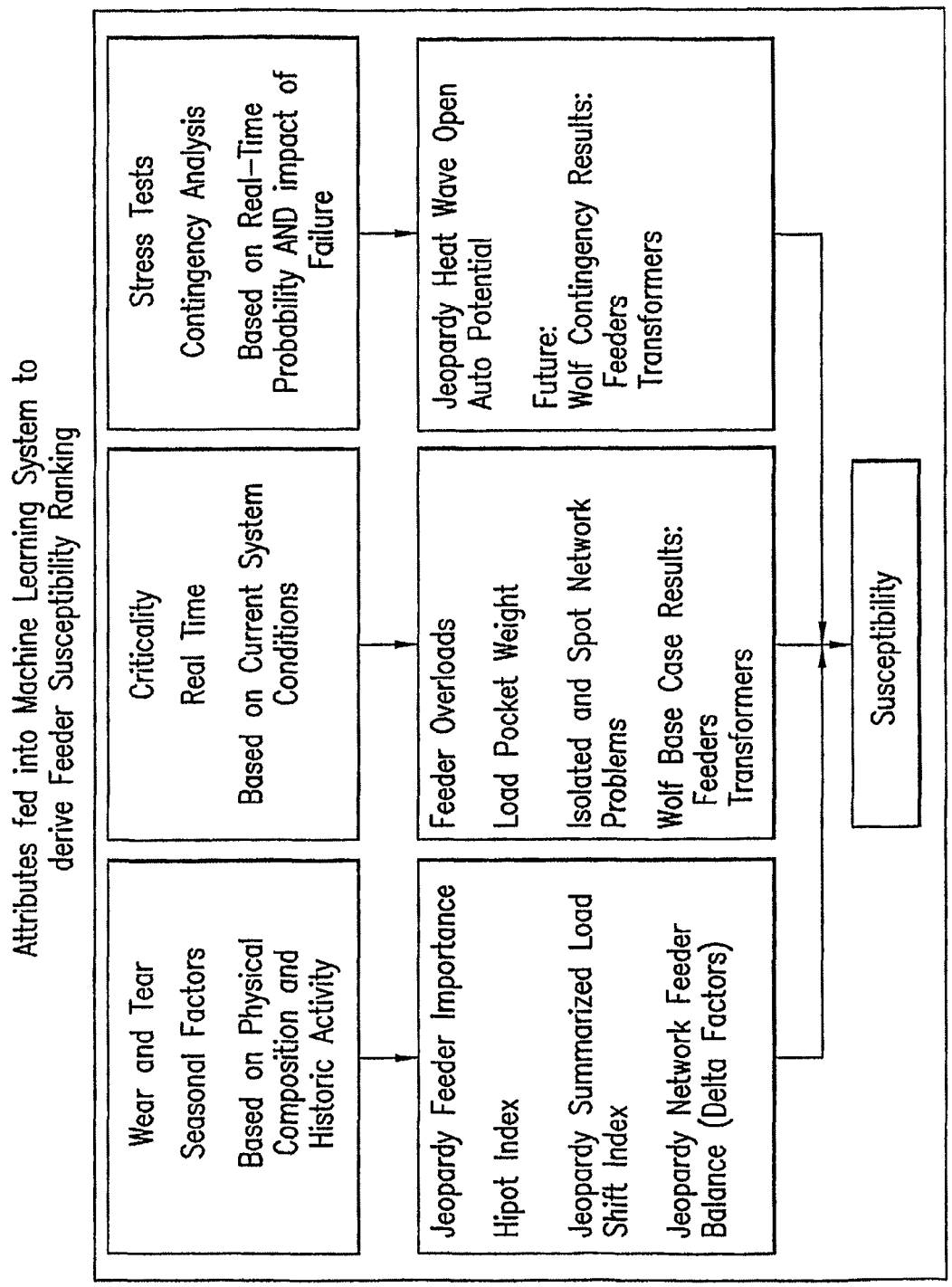

FIG. 15 is a schematic illustration of the types of attributes used as training data for machine learning algorithms that are designed to rank feeders by likelihood of impending failure.

FIG. 16 is a high-level pseudo code description of the dynamic online machine learning engine.

Appendix A is an exemplary list of static and dynamic feeder attributes used for training ranking models, in accordance with the principles of the present invention.

DETAILED DESCRIPTION

The present invention provides systems and methods for computationally determining which feeders in an electrical distribution system are most susceptible to impending failure with sufficient accuracy so that operational or maintenance actions with respect to the electrical distribution system can be prioritized to first account for the most-at-risk feeders and then the less-at-risk feeders.

The inventive systems and methods for ranking feeders by failure-susceptibility are based on machine learning techniques. An exemplary Ranker for Open-Auto Maintenance Scheduling ("ROAMS") system is provided for creating failure-susceptibility rankings of components in networked enterprises (e.g., an electrical utility's primary distribution network). The ROAMS system computes likelihood-of-failure scores for individual components (e.g., feeder cables, joints, switches, and transformers), and then rank the components in ascending or descending order of failure susceptibility. The ROAMS system exploits computational machine leaning algorithms to predict future outcomes based on past performance, attributes and the dynamic state of the electrical distribution system components. The computational machine learning algorithms are designed to learn how to sort components into risk categories for asset management and to further calculate risk rankings for the components. For instance, the computational machine learning algorithms may begin by classifying which components are at extreme risk or not, at significant risk or not, at moderate risk or not, etc., and then further use the data to calculate a ranking of the risk of imminent failure for every component in the electrical distribution system.

The computational machine learning algorithms can effectively combine information on many system attributes to predict future outcomes based on past performance and the dynamic state of the system. Individually, each system attribute may be only weakly associated with future outcomes, but a suitably selected class or combination of attributes, which is obtained by training on past performance data (see e.g., FIG. 2 database 230, and FIG. 7 database of summer '05), can be a strong aggregate predictor of future outcomes. The electrical distribution system may be continually monitored and the past performance training data may be appropriately updated to allow for dynamic or continuous improvement in the classification of attributes by the computational machine learning algorithms. The computational machine learning algorithms can take account of information redundancy in various attributes to minimize the number of attributes that need to be monitored for real-time assessment and prediction.

The computational machine learning algorithms used in ROAMS may be based on, for example, artificial neural networks, nonlinear regression, support vector machines (SVM), boosting, and/or reinforcement learning techniques. Each of these techniques has its own characteristic "inductive" bias when evaluating data. The techniques used in ROAMS may be selected on an application-by-application basis with consideration of the techniques' inductive biases and the quality of the aggregate predictors desired or obtained in the specific application circumstances.

Figure 1:
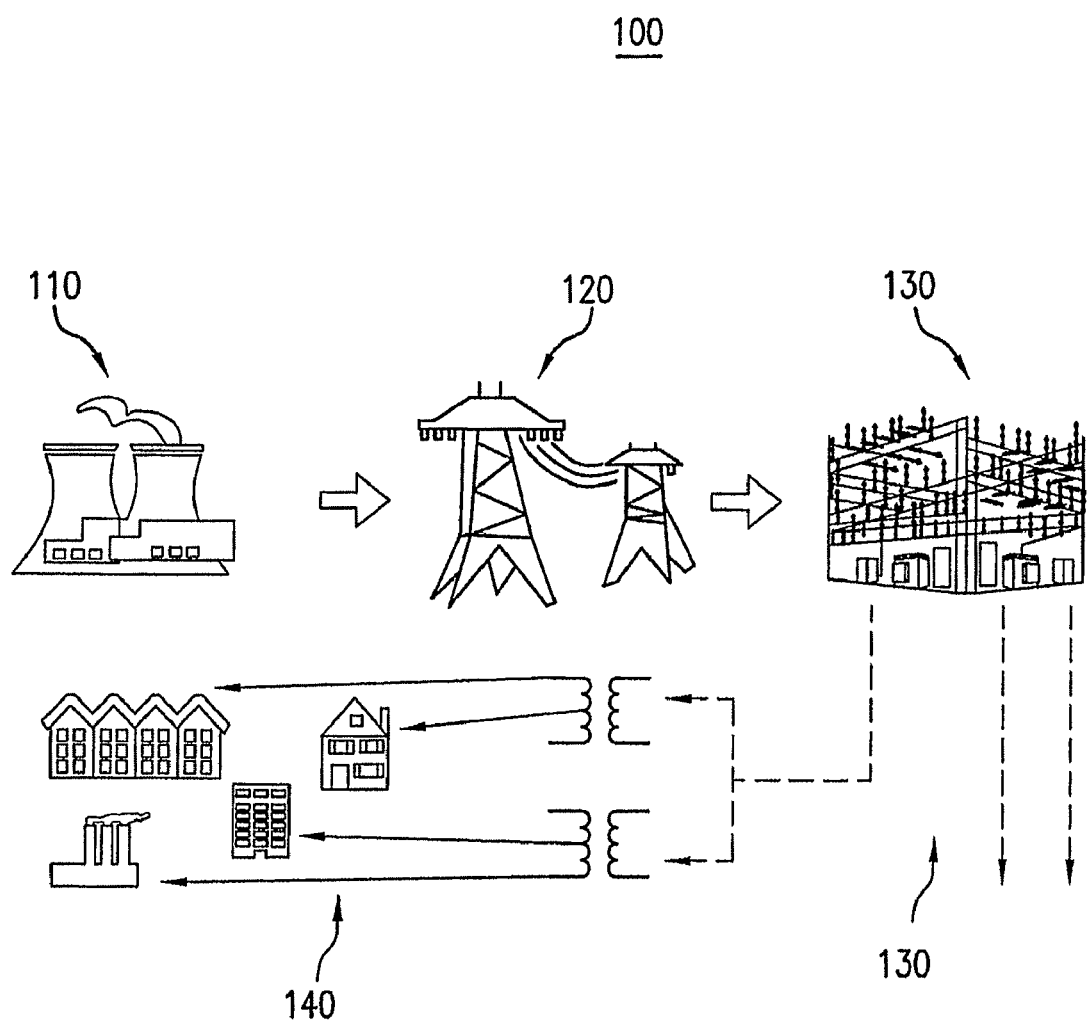
Figure 2:
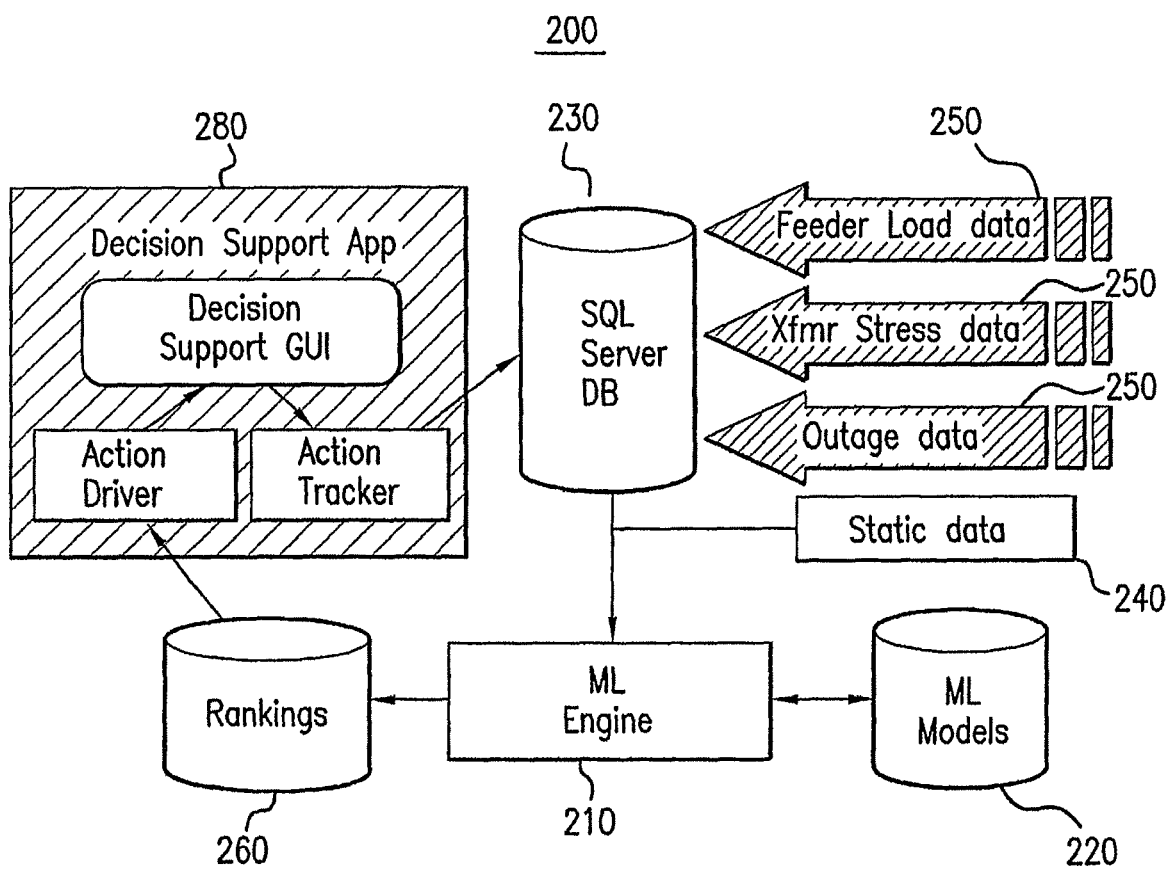
FIG. 2 is a block diagram illustrating the machine learning feedback loop in ROAMS when ranking electrical distribution system components according to their failure susceptibility, in accordance with the principles of the present invention.

FIG. 2 shows the structure of ROAMS system 200 for feeder ranking. System 200 may be configured to address the specific problem of ranking primary distribution feeders according to their susceptibility to failure.

System 200 includes a machine learning engine (e.g., ML engine 210) and feeder status models (e.g., models 220) that are learned or trained on system data stored in a database (e.g., an SQL server database 230). The electrical distribution system data on which the models are learned and updated includes both static data 240 and dynamic data 250. Static data refers to data which is to be applied over a long term (e.g., the current year or season), and dynamic data refers to data that is to be applied or is applicable to a short term interval (e.g., minutes, hours, or days, a load cycle, a few load cycles, a seasonal window, etc) around the time of an event (e.g., a failure or outage event). Static data may include data on static feeder attributes, for example, feeder age, length, Hi-pot insulation test values, and jeopardy values. Dynamic data may include data on operational feeder attributes, for example, power quality data, feeder load data, secondary stress data, and outage data. FIG. 15 and Appendix A show useful data types that may be available as training data in the context of ConEd's electrical distribution system. The useful data types may include native characteristics based on physical composition or operational conditions (e.g., component age, insulation type, or current load, etc.), and synthesized characteristics obtained by other data analysis (e.g., Hipot index, Wolf contingency analysis, etc.).

An exemplary machine learning system ("Ranker for Open-Auto Maintenance Scheduling" or "ROAMS"), similar to that shown in FIG. 2, was developed to create failure susceptibility rankings for almost one thousand high voltage (e.g., 13.8 kV, 27 kV, and 33 kV) underground feeder cables that supply electricity to the boroughs of New York City. The IDSFS decision support interface of the ROAMS system was configured to update rankings every 15 to 20 minutes and to display them on electrical utility operators' screens. The results of trials of the ROAMS/IDSFS system are described in "Predicting Electricity Distribution Feeder Failures Using Machine Learning Susceptibility Analysis," P. Gross, A. Boulanger, M. Arias, D. L. Waltz, P. M. Long, C. Lawson, R. Anderson, M. Koenig, M. Mastrocinque, W. Fairechio, J. A. Johnson, S. Lee, F. Doherty, A. Kressner, AAAI 2006, July 2006, which publication is incorporated by reference herein.

For trial application of the ROAMS to ConEd's electrical distribution system in New York City, attribute data in three general categories (shown in FIG. 15) was collected into database 230. The sources of data relating to states of wear-and-tear of feeder sections and joints were primarily the underlying databases that support ConEd's Jeopardy and Monitor Monte Carlo analysis applications for evaluating the overall health of networks, and the data going into the Hipot selection program. Further, shifted load factors for feeders, and age and composition of joints and sections data was available from the High Potential field test databases and the Jeopardy program databases, which included Monte Carlo estimation of the odds of failure of individual components). Data on the criticality of feeders and transformers was added through real-time data streams obtained from the continuous running applications (e.g., "WOLF" for simulation of power flows in distribution networks), and the summing over each feeder of Load Pocket Weights (LPW) that score load pocket problems on the secondary network associated with each transformer fed by a feeder. The LPW score the number of transformers, secondary wiring, and SCADA sensors that are out of commission in each neighborhood (Load Pocket) with a weighting algorithm (Weight). Data on the state of stress on each feeder may be obtained by running simulations of heat waves using the Monitor program from the Jeopardy analysis package.

A particular data set suitable for machine learning was constructed with consideration of the features and characteristics of the feeder attributes, in accordance with the principles of the present invention Appendix A lists exemplary sets of attributes in named categories (i.e., Compositional, Electrical Design, Past Outage History, Derived, and Dynamic) that were used as training and test data in the trial applications. There were more than 400 different data attributes, which were investigated using different types of machine learning algorithms, to determine the most effective combination of attributes that predict future failures of feeders (e.g., OA). It will be understood that the set of attributes and the main categories listed in Appendix A are exemplary and can be modified or changed in practice, for example, in response to training results.

Several factors or features of the data attributes are relevant to the selection of the particular data set suitable for machine learning. For example, many feeder attributes are aggregations of component attributes over the length of the feeder. A feeder may have over 100 individual cable sections linked by similar number of joints that splice them together along with up to 50 transformers of different ages, makes and configurations. Aggregation functions such as %, SUM, MAX, AVG, COUNT over classes of components are typically distinguished by age ranges, make and configuration and are a used to derive feeder attributes from its components. For example, the attribute mon_percent_E21GT93 is the percentage of Elastimo 2 Way/1 Way Stop joints installed after the year 1993 in the total joints of a feeder.

Further, for example, attributes in an underlying database may have a magnitude in a continuous range. These attributes are in some cases derived by aggregating over the range of the attribute value takes over time. For example, lpw_prev_1.00d_max_rms is the maximum of root mean square (RMS) value of the load pocket weights over all the transformers on the feeder over the past day. In other cases, the range of values is binned, or thresholded, at a multiplicity of levels. For example, wolf_fs__110 is the count of sections of the feeder above 110% of their emergency rating.

As another example, attributes in an underlying database that represent time series or have multiple, regular or irregular events over time are aggregated over a range in time from feeder outage times. For example, Overvoltage_allpre_month_max_kv is the Maximum kV of the Overvoltage recorded by Power Quailty Node (PQ Node), which measures the magnitude, frequency, and duration of transients that sometimes propogate across the network) within 30 days prior to the outage event, and outAuto_allprev_season is the count of Open Auto type of feeder outages in all past seasons based on the season within which the current outage occurs. Building a data set for this type of attribute requires re-aggregation of these attributes for every outage.

The training and test datasets were prepared not by random sampling, but by using principles of statistical causal inference (e.g., using the procedure shown in FIG. 5). Along with the failed feeders, other feeders were selected to be in the training dataset based on their situational association with a specific failed feeder (e.g., a feeder in the same network, a feeder in the same borough, and the failed feeder itself but at a prior time when it had not failed). Other feeders were included in the training dataset based on similarity measures (e.g., Euclidean Distance, Mahalanobis Distance, or Propensity Scores) commonly used in statistical causal inference. The feeder attributes used in the similarity measures were selected manually or by an algorithm.

With renewed reference to FIG. 2, ML engine 210 generates and updates feeder status models 220, and then uses these models to create feeder rankings (e.g., rankings 260), which can be displayed to an operator via a suitable interface (e.g., a decision support application 280). Further, any decisions or actions taken in response to rankings 260 are tracked and stored back in the database 230. Changes in the electrical distribution system behavior caused by the decisions or actions are also recorded in database 230 via, for example, updated feeds of static data 240 and dynamic data 250. This arrangement provides a feedback loop for learning improved models 220 and for gauging the effectiveness of actions taken. (See e.g., FIG. 14.) ML engine may evaluate the difference in expected and actual electrical system behavior to improve ML models 220.

It is noted that, unlike prior art expert or rule-based systems, the models and rankings according to the present invention are learned entirely from actual system data stored in database 230 without involving or needing subjective or qualitative human input.

In the trial applications of the ROAMS system, a mixture of static feeder data (e.g., age, composition, and electrical characteristics of each feeder section) and dynamic feeder data (e.g., electrical load data for a feeder and its transformers, accumulating at a rate of several hundred megabytes per day) was combined into a large feeder data table. The feeder data table included compositional and electrical design data for individual feeder section components including joints, cable sections, and transformers. Further, the feeder data table included past outage data, and modeled or derived data (e.g., feeder Jeopardy, Monitor and Hipot rankings).

The ML engine in ROAMS is designed as a ranking engine that produces in real-time a list of the network's feeders that is sorted according to their susceptibility to failure (e.g., in descending order from the most susceptible to the least susceptible to failure). The ML engine in ROAMS applies a Support Vector Machine algorithm or a martingale boosting algorithm to training data sets to develop feeder failure models. The Support Vector Machine algorithm is a standard algorithm while the martingale boosting algorithm is similar to the algorithm described in International patent application No. PCT/US06/035775.

The martingale boosting algorithm in ROAMS combines several "weak learners" or simple classification rules, each with low individual accuracy, into a powerful single model with high predictive accuracy. The weak learners are functions defined by the ranking produced by sorting on a single attribute. See also, P. Long and R. Servedio, "Martingale Boosting," Eighteenth Annual Conference on Computational Learning Theory (COLT), 2005, pp. 79-94. Each weak learner consists of one or more attributes and associated values. These learners form the basis of generating casual models of system and system component failures and also for developing system and system component configurations that are resistant to failure.

FIG. 3a shows a high-level pseudo-code description of an exemplary martingale boosting algorithm ("MartiRank Algorithm"), which may be deployed in the ROAMS system to obtain feeder rankings. FIGS. 6 and 7 are block diagrams which schematically show the application of the MartiRank Algorithm to training data sets to generate a trained failure susceptibly model 600. The model training data sets and training validation or test data sets may be extracted from a common database.

Figure 3B:
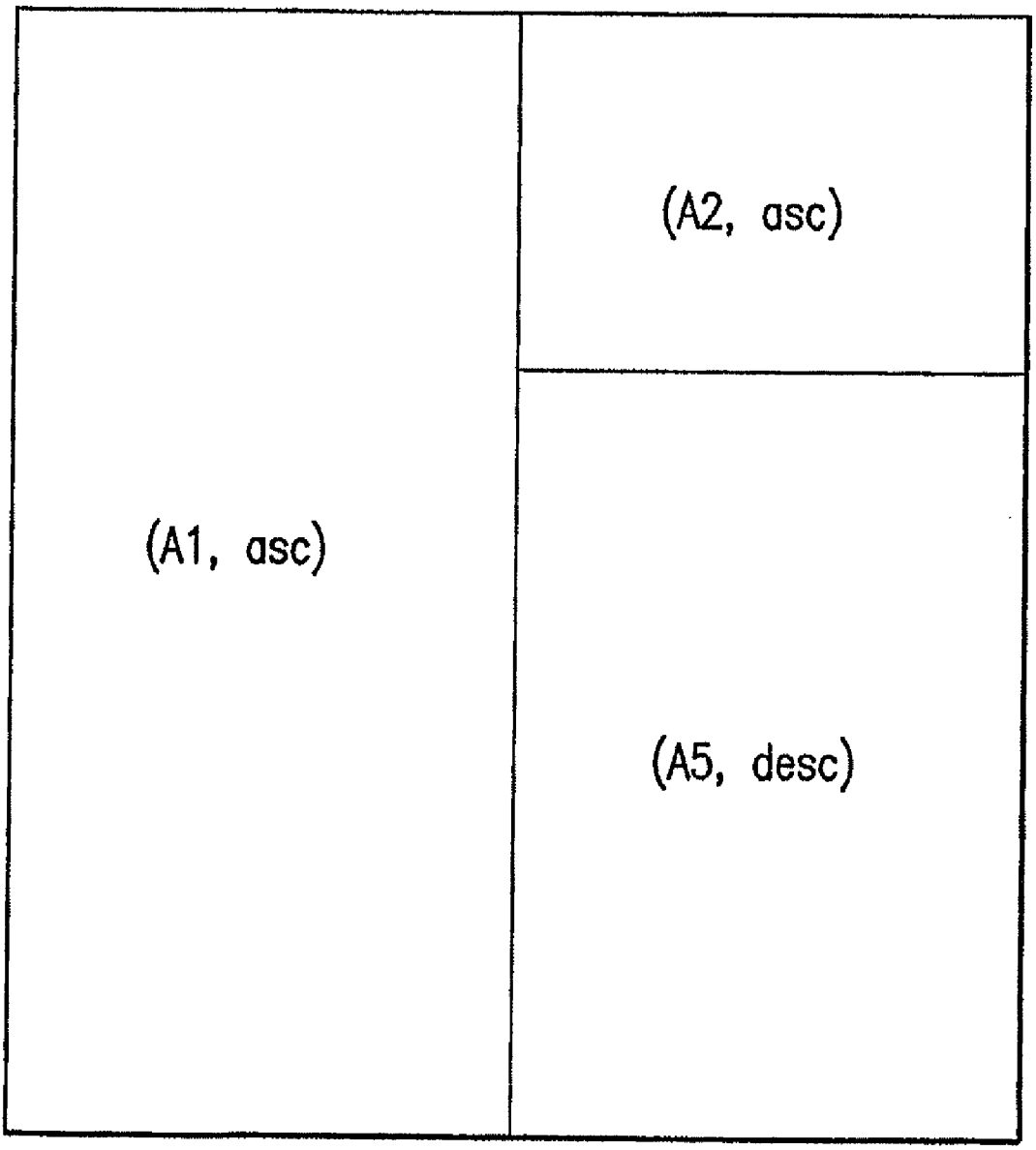

The MartiRank Algorithm is a sorting algorithm. The MartiRank Algorithm greedily selects in each of its levels or learning rounds (e.g., from round $t=1$ to $t=T$) the attribute that is most correlated with the feeder failures listed in the given training data set, and identifies the polarity of the attribute sort for ranking the feeders in ascending or descending order. In round t, the MartiRank Algorithm splits the total data set into t sub-lists to each of which it applies its greedy attribute selection procedure. For example, FIG. 3b shows the generic structure of a sorting model developed by application of the MartiRank Algorithm with 2 rounds or levels of iterations (i.e., $T=2$). In the first round ($t=1$), the MartiRank Algorithm may sort a list of feeders including failed feeders by failure-correlating attribute A1 in ascending order. In the second round ($t=2$), the MartiRank Algorithm splits the list of feeders into 2 sub-lists, each of which includes approximately one-half of the total number of failed feeders, It will be noted that the length of the limiting line shown in FIG. 3b implicitly describes the split of the sub-lists. In the ranking process, the MartiRank Algorithm finds the attributes that have the strongest association with the past failure rate, for example, by computing the quality of each list or sub-list Li sort (FIG. 3). The two sub-lists are then respectively sorted by attributes A2 and A5, which have a better correlation with feeder failure than other attributes.

To compute the quality of each Li sort (or the comparative quality of any model rankings), the MartiRank Algorithm is suitably coded, for example, to evaluate generated feeder rankings using a metric based on a variant of Receiver Operating Characteristic Curves ("ROC Curves"), which is known as Area Under the ROC Curve ("AUC"). See Hanley, J. A. and B. J. McNeil, "The Meaning And Use Of The Area Under A Receiver Operating Characteristic (ROC) Curve," Radiology 143: 29-36, 1982. The AUC performance metric has been adapted to ranking and captures the extent to which failed feeders lie at the top of a ranking: an AUC close to the ideal result of 1.0 indicates that almost all actual outages are accounted for in the very top of the worst-feeders ranking obtained by applying the sorting attribute or model. An AUC close to the worst possible result of 0.0 indicates that all actual outages are at the bottom of the model ranking. An AUC of around 0.5 indicates that ranking is random. The ROC curves, which are plots of the cumulative number of failures versus the feeder susceptibility ranking (model ranking or attribute sort), are drawn for each sorting attribute or model under consideration. The sorting attribute or model having the highest AUC has the highest potential for predictive quality (i.e., it places the largest number of failures in the top of the ranked of the feeder population).

In the trial applications of the ROAMS system, the training data for the MartiRank Algorithm was augmented by suitable similarity measures that are used in statistical causal inference (e.g., measures such as Euclidean Distance, Mahalanobis Distance, or Propensity Scores) to better learn which attribute sequences lead to feeder failure. The similarity measures were used to define control groups of "placebo" feeders that have common or similar attributes such as similar shifted load characteristics, numbers of total joints per feeder, and sums of load pocket weights for neighboring transformers. Then for training, in an instance of a feeder failure (e.g., a feeder O/A), its data attributes are grouped with those of the placebo feeders from the control groups.

FIG. 5 shows an exemplary schema for delivery of the attribute data in paired groups, which can be integrated with the real-time training by the MartiRank boosting algorithm. With the data groupings under the schema, the MartiRank algorithm learns common trends or similarities among more than 400 attributes that are predictive of future O/As and troubled feeders.

FIG. 4 shows an exemplary feeder failure model 400, which is machine learned in four rounds of learning by the MartiRank algorithm using data sets defined by the schema of FIG. 5. In each round, the list or sub-lists of feeders are sorted by respective attributes associated with the highest AUC values. The performance of trained model 400 (i.e., the accuracy of its predictions) may be evaluated and assigned a quantitative metric (e.g., "Marti_Score") by testing model 400 predictions against test data sets (see FIGS. 7 and 8). Trained model 400 may be provided to utility operators along with its Marti Score to convey information on the effectiveness of the machine learning ROAMS system.

The control group schema of FIG. 5 may be exploited to examine daily variations in system performance. As an example, it may be practical to train failure-by-failure to produce a real-time ROC curve of prediction accuracy of the trained models. FIG. 9 shows Daily Area Under the ROC Curve (AUC) numbers that are calculated and plotted failure-by-failure over the year. In trials, the performance of IDSF models that were trained or re-trained on daily, weekly, and monthly basis was evaluated. In general, the models had very similar results, suggesting that the AUC is being controlled by dynamic attributes rather than by static attributes. Specifically, Load Pocket Weights summed over each feeder was selected as the most predictive attribute consistently throughout the hottest parts of the summer of 2005 (FIG. 10).

After a satisfactory model is trained on the data, the ROAMS system generates a feeder failure-susceptibility ranking list from a real-time feeders' description list by sorting the description list according to the attributes identified in the trained model (FIG. 10). The initial feeders' description list is processed level-by-level through the model. At each level of the model, the list is reshuffled according to the model attributes identified at that level.

The ROAMS system applies the trained model to the dynamic data to refresh or update the feeder failure-susceptibility ranking list. In the trial applications of the ROAMS system, the feeder failure-susceptibility ranking list was refreshed about every 15 minutes. The current feeder failure-susceptibility ranking lists were made available or displayed to users (e.g., utility control center operators and engineers) by a decision support application in real-time over a web-based interface.

An exemplary display shows the current rankings of the feeders, and highlights feeders that have changed ranking since the previous refresh 15 minutes earlier. Further, the decision support application integrates and displays relevant dynamic data collected in the process of assembling the training data sets. The relevant dynamic data may, for example, include information on the number of network components (e.g., feeder sections and transformers) that are operating at or close to their specification limits.

FIG. 11 shows a screen shot of an exemplary system application that may be useful for decision support. Operators can proactively take suitable remedial action based on an integrated view of the system status or condition. FIG. 11 shows a screen shot of a tracking application, which is used to track and gauge the effectiveness of actions taken to close open switches on transformers on susceptible feeders. FIG. 12 shows a screen shot of a SwitchCheck application, which is used by an operator to open a job and dispatch a crew to correct a transformer problem (e.g., to close a network protector switch on a transformer).

A real-time variance tracking application (FIG. 13) is used to record the effects of shifted load from de-energized feeders that are taken out of service for preventive maintenance or by OAs. Outages can be validated by comparing expected load shifts with observed load changes. Unusual increases in transformer load can be mitigated by closing switches on nearby transformers or cooling the over-stressed unit itself.

The feedback loop that compares real outages with predicted events (FIG. 14) allows the ROAMS system to validate the predictions derived by machine learning.

The ROAMS system advantageously allows the electrical utility to reduce feeder failure rates in a cost-effective manner. Feeder maintenance procedures can be condition-based instead of reactive. Scheduled condition-based maintenance reduces network failure risk, as work can be scheduled for times when load or demand is low so that the feeders to which load is shifted during maintenance continue to operate well within their specification limits. Targeting preventive maintenance to the most at-risk feeders has potential benefits in service reliability. In addition, being able to predict incipient failures in close to real-time can enable crews and operators to take short-term preventive actions (e.g., shifting load to other, less loaded feeders).

In accordance with the present invention, software (i.e., instructions) for implementing functions of the aforementioned machine learning systems and methods (algorithms) can be provided on computer-readable media. It will be appreciated that each of the functions (described above in accordance with the invention), and any combination of these functions, can be implemented by computer program instructions. These computer program instructions can be loaded onto a computer or other programmable apparatus to produce a machine such that the instructions, which execute on the computer or other programmable apparatus, create means for implementing the functions of the aforementioned machine learning systems and methods. These computer program instructions can also be stored in a computer-readable memory that can direct a computer or other programmable apparatus to function in a particular manner such that the instructions stored in the computer-readable memory produce an article of manufacture including instruction means, which implement the fictions of the aforementioned machine learning systems and methods. The actions of the operator and field workers are tracked, producing a feedback loop for continuous improvement in performance.

The computer program instructions can also be loaded onto a computer or, other programmable apparatus to cause a series of operational functions to be performed on the computer or other programmable apparatus to produce a computer implemented process such that the instructions which execute on the computer or other programmable apparatus provide functions for implementing the functions of the aforementioned machine learning systems and methods. It will also be understood that the computer-readable media on which instructions for implementing the aforementioned machine learning systems and methods are to be provided include, without limitation, firmware, microcontrollers, microprocessors, integrated circuits, ASICS, and other available media in control centers, engineering centers, and field operations such as trucks and repair crews.

It will be understood, further, that the foregoing is only illustrative of the principles of the invention, and that various modifications can be made by those skilled in the art without departing from the scope and spirit of the invention, which is limited only by the claims that follow. For example, the ROAMS system may be additionally configured to include a dynamic online model-selection engine that can monitor the performance of a pool of candidate models generated by varying different training mode parameters (e.g., training duration lengths, MartiRank's number of rounds, etc.). The dynamic model selection engine may be configured to select a combination of optimal or quasi-optimal model based on recent past performance of the candidate models and feedback from results of the field actions. In an exemplary implementation, an online engine runs once every night to compute each candidate's model performance based on the latest data received during the duration of the day, and updates its current view on each of the model's quality (e.g., by assigning a performance score between 0 and 1). The online engine tracks and updates these performance scores timely and regularly, which enables it to adapt to system changes without any human supervision. Predictions are made using a weighted average of the current top-scoring models. FIG. 16 shows a pseudo code description of the exemplary online engine.

What is claimed is:

1. A system for facilitating maintenance of feeders in an electricity distribution network, the system comprising:

values of a plurality of feeder attributes related to past performance history;
a particular dataset for training a model configured to determine the relative susceptibilities to failure of the feeders based on the values of the plurality of feeder attributes, wherein the particular dataset for training comprises data on feeders from a failure history database and other feeders that are selected based on their situational association with a specific failed feeder and/or selected based on a similarity measure used in statistical causal inference; and
a machine learning engine configured to train the model and to apply the trained model to the values of a plurality of feeder attributes so as to generate rankings of the feeders indicative of their relative susceptibilities to failure; and
a decision support application configured to provide the rankings of the feeders available to operators and engineers so as to facilitate maintenance of the feeders.

2. The system of claim 1, wherein the feeder attributes include static feeder attributes and dynamic feeder attributes.

3. The system of claim 1, wherein the feeder attributes include at least one of the feeder attributes listed in Appendix A.

4. The system of claim 1, wherein the machine learning engine includes one of a martingale boosting algorithm, a SVM algorithm and a combination thereof.

5. The system of claim 1, wherein the model comprises a ranking function with values determined by sorting a list of the feeders on a feeder attribute.

6. The system of claim 1, wherein the machine learning engine is configured to evaluate the model against test data using Area Under Receiver Operating Characteristic Curve metrics.

7. The system of claim 1, wherein the machine learning engine is configured to apply the model to dynamic feeder data based on field sensors to update the feeder rankings.

8. The system of claim 1, wherein the decision support application includes a web-based user interface.

9. The system of claim 1, further comprising a tracking application that determines the electrical system responses to maintenance actions taken on the electricity distribution network, and integrates the responses with the decision support application to optimize electricity distribution network performance.

10. The system of claim 1, further comprising an online model-selection engine that can monitor the performance of a pool of candidate models generated by varying different training mode parameters.

11. The system of claim 1, wherein the feeder attributes include a feeder attribute selected from cable sections, joints, transformers, terminators, load pocket weight, power quality, and past outage history.

12. A method for facilitating maintenance of feeders in an electricity distribution network, the method comprising:
providing a failure prediction model;
training the failure prediction model on values of a plurality of feeder attributes related to past performance history;
applying the trained failure prediction model to values of the plurality of feeder attributes so as to generate rankings of the feeders indicative of their relative susceptibilities to failure; and
providing the rankings of the feeders to operators and engineers so as to facilitate maintenance of the feeders.

13. The method of claim 12, wherein training the failure prediction model includes using a martingale boosting algorithm.

14. The method of claim 12, wherein training the failure prediction model on values of a plurality of feeder attributes related to past performance history, includes training on the values of at least one of the feeder attributes listed in Appendix A.

15. The method of claim 12, wherein applying the trained failure prediction model to values of the plurality of feeder attributes includes applying the model to dynamic values so as to dynamically update rankings of the feeders indicative of their relative susceptibilities to failure.

16. The method of claim 12, wherein providing the rankings of the feeders to operators and engineers includes providing the rankings over a web-based user interface.

17. The method of claim 12, wherein providing the rankings of the feeders to operators and engineers includes providing a tracking application that determines the electrical system responses to maintenance actions taken on the electricity distribution network.

18. The method of claim 17 further comprising providing a decision support application which integrates providing the rankings of the feeders to operators and engineers with the results of the tracking application to enable optimization of electricity distribution network performance and determining maintenance policies.

19. The method of claim 12, further comprising using an online model-selection engine to monitor the performance of a pool of candidate models generated by varying different training mode parameters.

20. The method of claim 12, wherein training the failure prediction model on values of a plurality of feeder attributes related to past performance history, includes training on the values of at least one feeder attribute selected from cable sections, joints, transformers, terminators, load pocket weight, power quality, and past outage history.

21. A computer-readable medium for facilitating maintenance of feeders in an electricity distribution network, the computer-readable medium comprising a set of instructions for:
training a failure prediction model on values of a plurality of feeder attributes related to past performance history;
applying the trained failure prediction model to values of the plurality of feeder attributes so as to generate rankings of the feeders indicative of their relative susceptibilities to failure; and
providing the rankings of the feeders to operators and engineers so as to facilitate maintenance of the feeders.

22. The computer-readable medium of claim 21, wherein the set of instructions includes a martingale boosting algorithm.

23. The computer-readable medium of claim 21, wherein the set of instructions includes instructions for training the failure prediction model on the values of at least one of the attributes listed in Appendix A.

24. The computer-readable medium of claim 21, wherein the set of instructions includes instructions for applying the trained failure prediction model to dynamic values of the plurality of feeder attributes so as to dynamically update the feeder rankings.

25. The computer-readable medium of claim 21, wherein the set of instructions for making the feeder rankings available to operators and engineers includes instructions for displaying the feeder rankings over a web-based interface.

26. The computer-readable medium of claim 21, wherein the set of instructions further comprises instructions for a feedback loop that measures electrical distribution network reactions to maintenance actions taken based on the feeder rankings made available to engineers an operators, so that electricity distribution network performance can be optimized.

27. The computer-readable medium of claim 21, wherein the set of instructions further comprises instructions to monitor the performance of a pool of candidate models generated by varying different training mode parameters.

28. The computer-readable medium of claim 21, wherein the set of instructions includes instructions for training the failure prediction model on the values of at least one attribute selected from cable sections, joints, transformers, terminators, load pocket weight, power quality, and past outage history.

29. A system for assessing likelihood of failure in an "items" distribution network, the distribution network having a plurality of networked or interlinked components involved in transmission of the items to end-users or recipients, the system comprising:
  a failure-prediction model configured to determine the relative susceptibility-to-failures of individual network components based on an input data set of network component attribute values; and
  a machine learning engine configured to train the model and to apply the trained model to the input data set so as to generate a list of the network components ranked by their relative susceptibility-to-failures.

30. The system of claim 29 wherein the items are one of electric power, water, communications, transportation, sewer, gas, and industrial goods and services.

31. A method for assessing likelihood of failure in an "items" distribution network, the distribution network having a plurality of networked or interlinked components involved in transmission of the items to end-users or recipients, the method comprising:
  providing a failure-prediction model configured to determine the relative susceptibility-to-failures of individual network components based on an input data set of network component attribute values;
  training the model on a training data set of network component attribute values; and
  applying the trained model to the input data set so as to generate a list of the network components ranked by their relative susceptibility-to-failures.

32. The method of claim 31 wherein the items are one of electric power, water, communications, transportation, sewer, gas, and industrial goods and services.

* * * * *